Aug. 26, 1924.
C. H. NORTON
1,506,724
MACHINE TOOL TABLE REVERSING MECHANISM
Filed Feb. 2, 1922   2 Sheets-Sheet 1
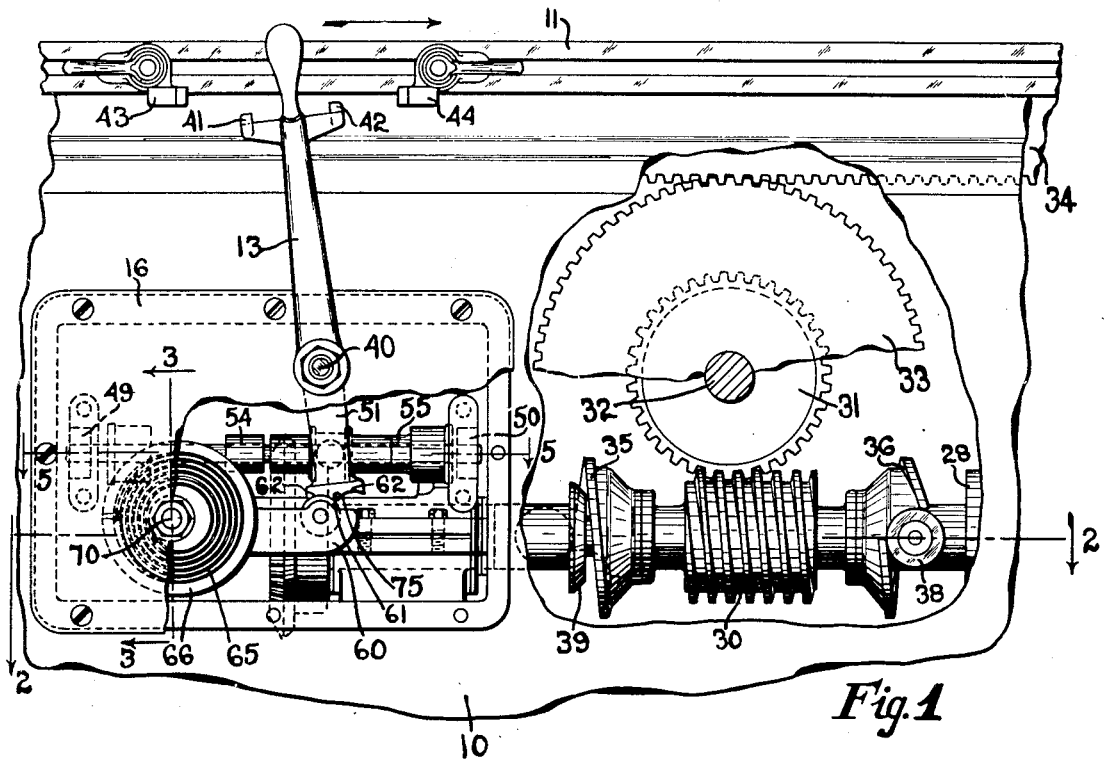
Witness
Harold W. Eaton
Inventor
Charles H. Norton
By Clayton L. Jenks
Attorney

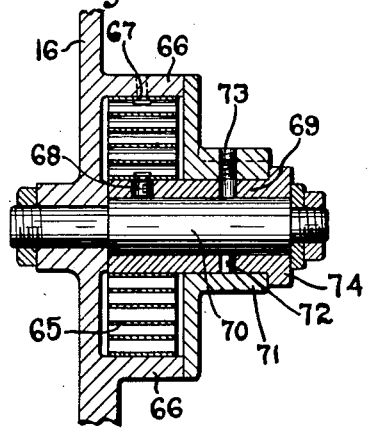
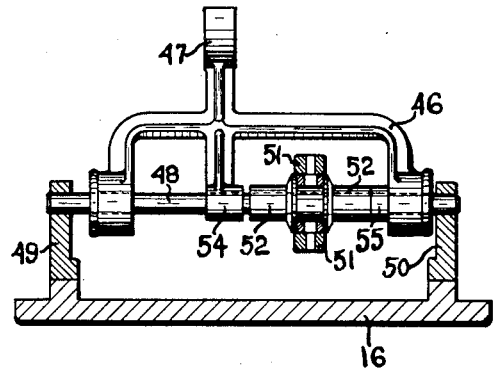
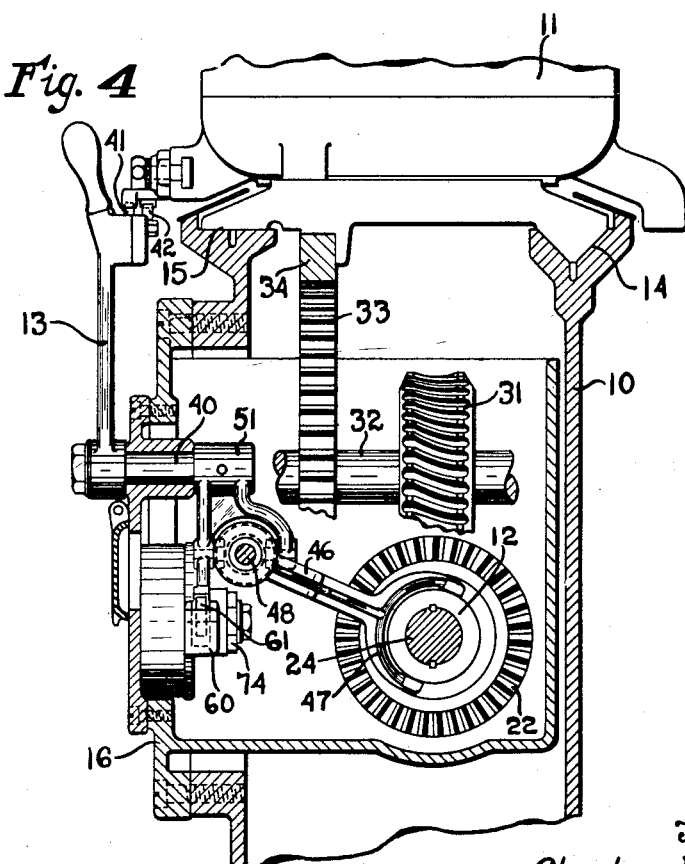

Patented Aug. 26, 1924.

1,506,724

UNITED STATES PATENT OFFICE.

CHARLES H. NORTON, OF WORCESTER, MASSACHUSETTS, ASSIGNOR TO NORTON COMPANY, OF WORCESTER, MASSACHUSETTS, A CORPORATION OF MASSACHUSETTS.

MACHINE-TOOL-TABLE REVERSING MECHANISM.

Application filed February 2, 1922. Serial No. 533,691.

*To all whom it may concern:*

Be it known that I, CHARLES H. NORTON, a citizen of the United States of America, residing at Worcester, in the county of Worcester and State of Massachusetts, have invented certain new and useful Improvements in Machine-Tool-Table Reversing Mechanisms, of which the following is a full, clear, and exact specification.

My invention relates to machine tools such as grinding machines, planers and milling machines and more particularly to a driving and reversing mechanism for reciprocating machine tool tables.

Heretofore, it has been common practice in driving and reversing mechanisms for machine tools to employ a load and fire mechanism to throw the reverse clutch. Such mechanisms ordinarily involve a spring so arranged that the motion of the table compresses the spring until a latch is tripped, than the released tension of the spring disengages a clutch and throws it into position for driving in the reverse direction. The friction between the clutch teeth varies with the speed of the table and the load on the table. Due to this variable friction, it is readily seen that the clutch teeth will not always be disengaged at the same point, if the tension of a spring is relied upon to throw the clutch, and so cause a considerable variation in the length of the stroke of the table. Hence it is difficult to move the table with any degree of accuracy and practically impossible to grind close to a shoulder while traversing the table normally relative to a grinding wheel.

It is accordingly an object of my invention to minimize these difficulties and to provide a driving and reversing mechanism for a machine tool table in which the clutch is positively disengaged at the same point at each reversal, irrespective of the load on or the speed of the table.

A further object of my invention is to provide such a driving and reversing mechanism with a quick acting device which will throw the clutch without delay into engagement for the reverse drive, after it has been positively disconnected, even if the driving parts shall have come to rest. Other objects will be readily apparent in the foregoing disclosure.

In the drawings, in which like reference numerals indicate like parts:

Fig. 1 is a fragmentary front view of a machine tool embodying my invention having parts broken away to more clearly show the construction;

Fig. 2 is a sectional view with the driving and reversing mechanism shown in full taken approximately upon the line 2—2 of Fig. 1;

Fig. 3 is a sectional view taken approximately upon the line 3—3 of Fig. 1;

Fig. 4 is a sectional view taken on the line 4—4 of Fig. 1, and

Fig. 5 is a sectional view taken on the line 5—5 of Fig. 1 showing clutch shifting mechanism in elevation.

In accordance with my invention I provide a machine tool, such as a grinding machine, with a driving and reversing mechanism in which the slidable member of the reverse clutch, which may be of the usual type, is so connected that the clutch teeth will be positively disengaged by a driven part of the machine. This is accomplished preferably by the motion of the table transmitted through connecting members so arranged that when the table has reached a predetermined position, the clutch teeth will be drawn out of contact and the clutch then quickly thrown into a reverse driving connection. This last step is preferably caused by an improved and simplified load and fire mechanism which serves only to connect the clutch members and has no influence over the act of disconnecting them.

As a specific embodiment of my invention, I have illustrated my improvements as employed in a grinding machine, which comprises a base 10 upon which the table 11 is mounted for reciprocation on the usual V way 14 and the flat way 15. The reversing and driving mechanism is preferably carried within the casing 16, which is secured to the base 10 by means of screws. This mechanism may be in part of the type shown and fully described in my prior Patent No. 1,385,970 of July 26, 1921 to which reference may be had for a detailed description thereof. The drive gear 17 driven from any source of power, is mounted on the shaft 18, which is mounted for rotation in the bearing 19. This shaft 18 drives through a reversing mechanism for reciprocating the table, which may consist of a bevel gear 21 mounted on the inner end of the shaft 18 and meshing with the two gears 22 and 23 rotatably mounted on the shaft 24. The bevel gears 22 and 23 are provided with clutch teeth, 25 and 26, adapted to engage similar teeth on a clutch member 12 slidably keyed on the shaft 24 between the beveled gears 22 and 23 for rotating the shaft 24 in either direction as is well understood in this art. The shaft 24 is mounted in suitable bearings 27 and 28 in the casing 16 and provided with a driving worm 30 meshing with the worm gear 31, which is mounted for rotation with the shaft 32. The spur gear 33 is driven by the shaft 32 and meshes with a rack 34, which is mounted by suitable means on the under side of the table 11.

If it is desirable to employ an easy start mechanism, the construction shown in my prior patent may be used. In that case the worm 30 is loosely mounted on the shaft 24 for endwise movement, which is controlled by the cams 35 and 36 attached to the worm and the rollers 37 and 38 mounted to rotate with the shaft. These parts are so constructed that initial rotation of the shaft causes the worm to move axially at a gradually increasing rate until one of the friction drives 39 connects the worm to the shaft and starts it rotating at full speed. The worm serves first as a rack bar to start the table into motion and then in its normal capacity to rotate the gear 31.

To obtain the object of my invention, I provide the slidable clutch member 12 with suitable means whereby the clutch teeth may be positively disengaged when the table has reached a predetermined position. I preferably accomplish this by connections through which the table may operate directly to throw the clutch. To this end, I pivotally mount a reversing lever 13 on the pin 40 fixed in the casing 16. This lever has offset projections 41 and 42, at its upper end which are adapted to be acted upon at the point of reversal by the adjustable reversing dogs 43 and 44 slidably mounted in a T-slot on the side of the table. The clutch is thrown by a shift member 46, which has a yoke 47 engaging an annular groove in the slidable clutch member 12 and is slidably mounted on the rod 48. This rod is mounted in the brackets 49 and 50 which are secured by means of screws to the casing 16. The inner end of the pivot 40 is provided with a yoke 51 which is adapted to engage an annular groove in the slidable collar 52, which is mounted on the rod 48. In order to form a rigid support for the inner end of the pivot 40, I provide a bearing member 53, which is secured by means of screws to the casing 16. If desired, I may provide a lost motion by making the collar 52 shorter than the distance between the bearings 54 and 55. This permits a shorter time interval between breaking the connection and throwing it for the reverse stroke, as will be apparent. When either of the reversing dogs 43 or 44 on the moving table comes in contact with the adjacent lug 41 or 42 the reverse lever 13 is moved, the lost motion between the collar 52 and the bearings 54 and 55 of the yoke 46 being first taken up, after which further motion of the table positively disengages the clutch teeth.

In order that the clutch may be thrown into the reverse position I may provide a quick acting device, embodying, as shown, a spring pressed arm 60 having mounted thereon a roller 61 which is adapted to engage one or the other of two grooves 62 in an extension 63 on one arm of the yoke 51. The grooves 62 on the lower surface of this arm have partial cylindrical surfaces which conform with the shape of the roller 61. The roller carried on the arm 60 is held in contact with one or the other of the grooves 62 by means of the spiral spring 65, mounted within the casing 66 which is formed as an annular projection on the casing 16. One end of the spiral spring 65 is secured to the casing 66 and the other end to the arm 60, these parts being so arranged as to hold the roller 61 firmly in contact with the extension 63. If it is desired that the tension of the spring be capable of variation, I may employ the construction illustrated. As shown in Fig. 3, the outer end of the coil spring 65 is secured to the stud 67 and the inner end is connected by means of the stud 68 to a bushing member 69, which is mounted for rotation on the shaft 70. The arm 60 has a flanged portion and hub 71, which is mounted upon the bushing 69. The latter is provided with a plurality of holes 72, which permit the hub 71 of the arm 64 to be locked to the bushing by means of the locking screw 73. The bushing 69 is provided with a hexagonally shaped flange 74 to which a wrench may be applied for adjusting the tension of the spring 65 after the screw 73 has been withdrawn to unlock the bushing. When the desired tension has been reached, the screw 73 is again inserted into the nearest hole in the bushing 69, thus locking the bushing 69 and the arm 60.

In the operation of my driving and reversing mechanism, let us assume that the table is travelling in the direction of the arrow shown in Fig. 1. As the table 11 continues to travel the dog 43 comes in contact with the lug 42 on the reversing arm 13 and causes the reversing lever 13 to be moved to the right. This in turn moves the yoke 51 and the collar 52 until the lost motion has been taken up and then the collar acts against the bearing 54 of the yoke 46, to positively disengage the clutch teeth 26. This operation takes place shortly before or just as the roller 61 reaches the high point 75, between the grooves 62. The momentum of the table 11 causes the lever 13 to move until the roller 61 has passed the high point 75, whereupon the spring 85 acts to move the lever and the arm 51 quickly into the reverse position, thereby engaging the clutch member 12 with the clutch teeth 25 on gear 22. The shaft 24 then starts rotating in the reverse direction and in turn drives the worm gear 31 and spur gear 33 to move the table 11 in the opposite direction until the dog 44 strikes the lug 41 and the lever 13 is again moved.

Having thus described my invention, what I claim as new and useful and desire to secure by Letters Patent is:

1. In a machine tool having a reciprocable table, a driving and reversing mechanism for the table including a reversing clutch having a shiftable member, a slide yoked to said member, a reversing lever, a lost motion connection between said lever and slide, means to move said lever when the table has reached a predetermined position to positively disengage the clutch and a resilient device automatically effective thereafter to engage the clutch in the reverse direction.

2. In a machine tool having a reciprocable table, a driving and reversing mechanism for the table comprising a reversing clutch having a shiftable member, a yoke engaging said member, a rod slidably supporting said yoke, a reverse lever, adjustable dogs on the table to actuate said lever, a sleeve slidably mounted on said rod to transmit motion of the reverse lever directly to the clutch member, said sleeve being separated from the yoke to provide lost motion therebetween, and a resilient device effective to slide the clutch member after the clutch has been disconnected by movement of the reverse lever.

Signed at Worcester, Massachusetts, this 30th day of Jan. 1922.

CHARLES H. NORTON.